Dec. 27, 1960  J. R. AUDE ET AL  2,966,240
AUTOMATIC BRAKE
Filed Oct. 22, 1956  5 Sheets-Sheet 2

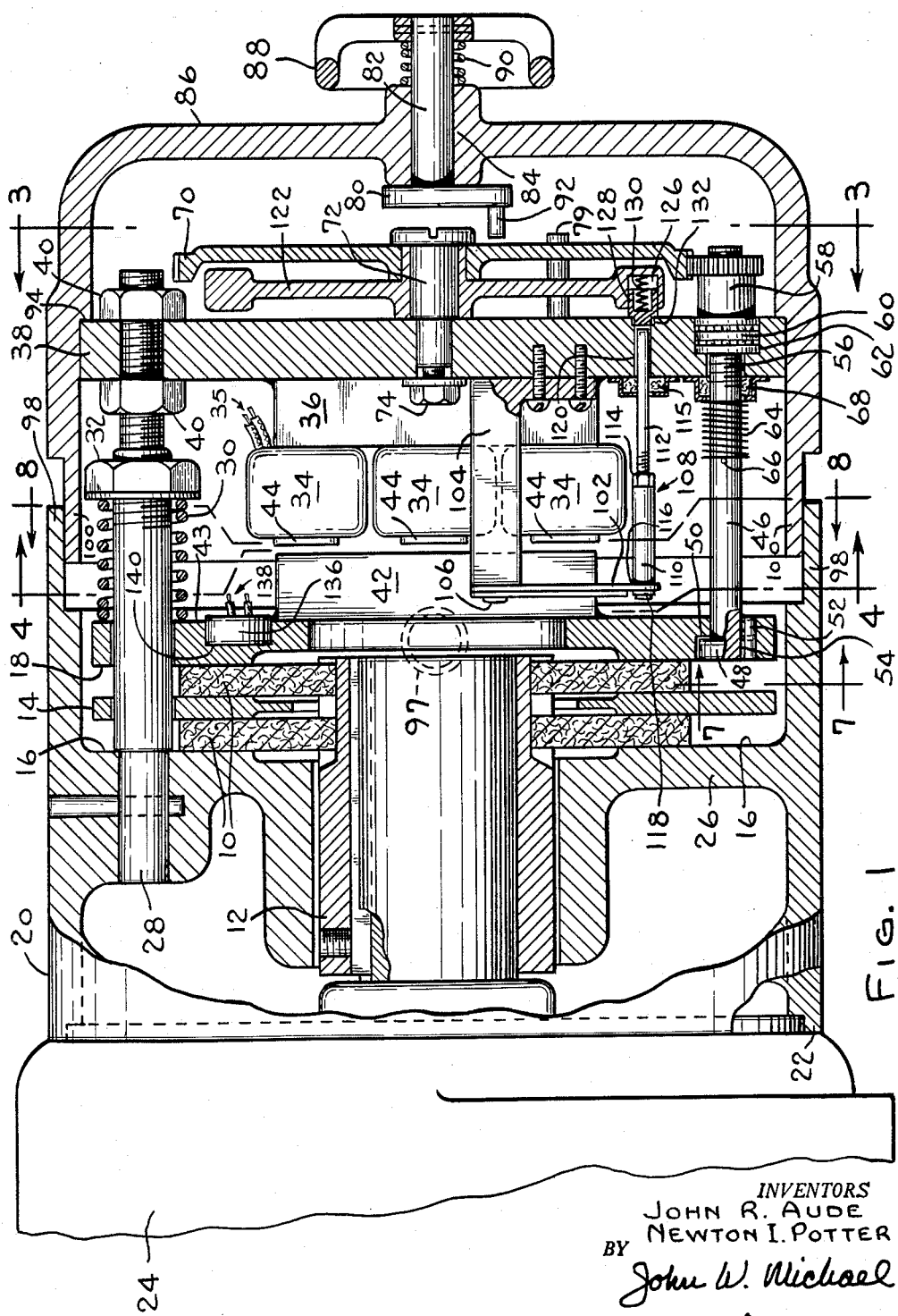

INVENTORS
JOHN R. AUDE
NEWTON I. POTTER
BY John W. Michael
ATTORNEY

INVENTORS
JOHN R. AUDE
NEWTON I. POTTER
BY John W. Michael
ATTORNEY

Dec. 27, 1960    J. R. AUDE ET AL    2,966,240
AUTOMATIC BRAKE
Filed Oct. 22, 1956    5 Sheets-Sheet 4

INVENTORS
JOHN R. AUDE
BY NEWTON I. POTTER
John W. Michael
ATTORNEY

Dec. 27, 1960    J. R. AUDE ET AL    2,966,240
AUTOMATIC BRAKE
Filed Oct. 22, 1956    5 Sheets-Sheet 5

INVENTORS
JOHN R. AUDE
NEWTON I. POTTER
BY
John W. Michael
ATTORNEY

United States Patent Office 2,966,240
Patented Dec. 27, 1960

2,966,240

AUTOMATIC BRAKE

John R. Aude, Milwaukee, and Newton I. Potter, Waukesha, Wis., assignors, by mesne assignments, to Wehr Steel Company, a corporation of Wisconsin Filed Oct. 22, 1956, Ser. No. 617,431

12 Claims. (Cl. 188—171)

This invention relates to automatic brakes of the type which are set by spring pressure and released by electromagnetic or other means and particularly to such brakes which are safe for use in hazardous conditions.

In the operation of such brakes in hazardous locations, it is essential to prevent brake temperatures from becoming sufficiently excessive to cause combustion of explosive mixtures such as gasoline vapors etc. Such critical temperatures result from too frequent cycling of the brake, and shorted coils. When the brake is on an electric motor used to raise and hold a load it is also desirable to prevent such critical temperatures without release of the brake.

It is an object of this invention, therefore, to provide a brake of this type which will not heat to such critical temperatures and will meet the safety standards required for use in hazardous locations.

Another object of this invention is to provide a brake of this type which will not heat to such critical temperatures and will not release when used for holding a load.

Another object of this invention is to provide a brake of this type which may be readily restored to normal operating conditions following the functioning of the safety mechanisms designed to prevent such critical temperatures.

Another object of this invention is to provide a brake of this type which will prevent the escape to the exterior thereof of any vapors forming in the interior thereof.

In obtaining these objects the brake is provided with a potential energy device which is controlled by a thermostatically operated lock. When the temperature of the brake becomes critical the lock is released and the potential energy device frees the spring pressure on the brake discs. This stops the heat caused by friction of the brake discs. An additional thermostatic switch may also be employed to break the circuit to the motor on which the brake is installed and to the coil of the electromagnetic releasing mechanism. This thermostatic switch is set to open before the thermostatically operated lock thus stopping the motor and de-energizing the electromagnetic coil to prevent further increase in temperature from too frequent cycling of the brake or shorted coils while the brake will remain set by spring pressure. The brake has a case which is sealed to confine internal flame and prevent escape of burning vapors. The heat producing parts of the brake are in direct contact with parts of the casing to dissipate heat and prevent critical temperatures.

Fig. 1 is a sectional view of an automatic brake embodying the invention taken along line 1—1 of Fig. 3;

Figure 5:
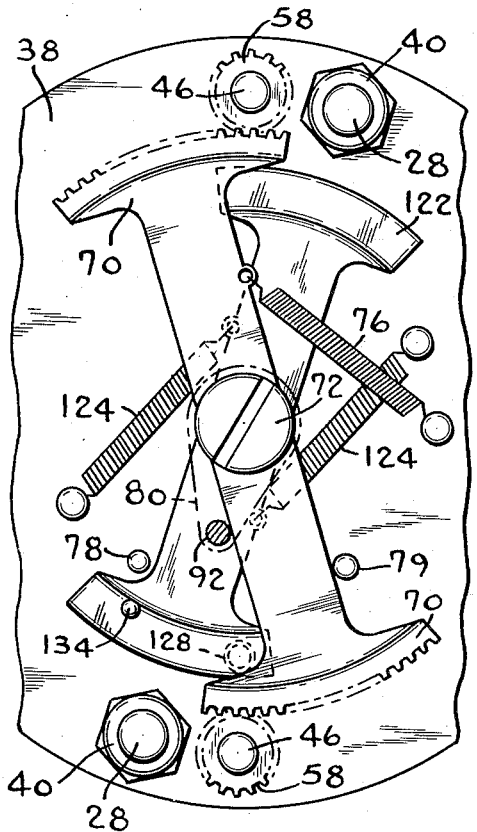
Fig. 5 is a view similar to Fig. 3 but showing the position of the parts after manual release of the brake.

The brake consists of rotating discs 10 splined to a hub assembly 12 adapted to be secured to the shaft of a motor, non-rotating disc 14 between such rotating discs, a stationary inner wall 26 having a braking surface 16, and a non-rotating outer disc or pressure plate 43 having a braking surface 18 through which pressure is applied to set the brake. The hub and discs are mounted within a housing 20 which has an annular flange 22 for mounting the brake to an electric motor 24. The non-rotating discs are slidably mounted on studs 28 pinned in inner wall 26. Compression springs 30 are mounted on such studs to bias the non-rotating outer disc toward the stationary disc to set the brake. The tension of such springs is adjusted by a nut and washer assembly 32 threaded to the studs.

The springs are rendered ineffective to set the brake and the brake released electromagnetically by the energization of electromagnets 34 connected by conductors 35 into the motor circuit and mounted in frames 36 secured to a mounting plate 38. This plate is adjustably mounted on the studs between two nuts 40. Armatures 42 positioned opposite the electromagnets and spaced a minimum of $\frac{1}{16}$ of an inch therefrom are secured to pressure plate 43 slidably mounted on the studs. When the electromagnets are energized the armatures are drawn toward their cores 44 and the pressure plate pushes against the springs so that the force of such springs is removed from the brake. In the embodiment shown, braking surfaces 16 and 18 are shown formed on inner wall 26 and pressure plate 43, respectively. However, these braking surfaces could be formed on separate members like the non-rotating disc 14 in which case the brake would include three non-rotating and two rotating members compressed between inner wall 26 and pressure plate 43 except when the pressure plate is withdrawn electromagnetically or by the mechanisms hereafter described.

Figure 3:
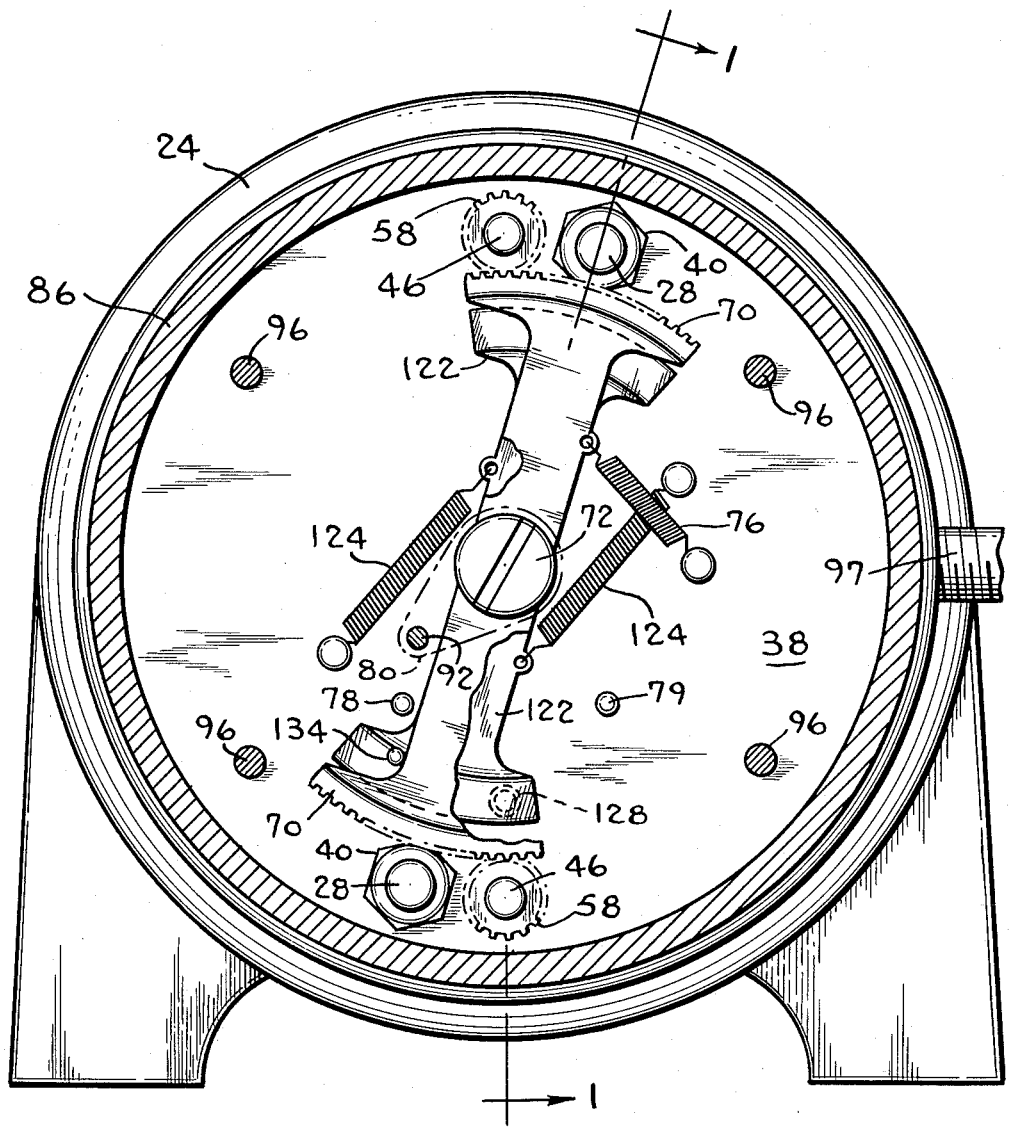
Fig. 3 is a view taken along line 3—3 of Fig. 1 showing the release mechanism in set position and the potential energy device in cocked position.
Figure 4:
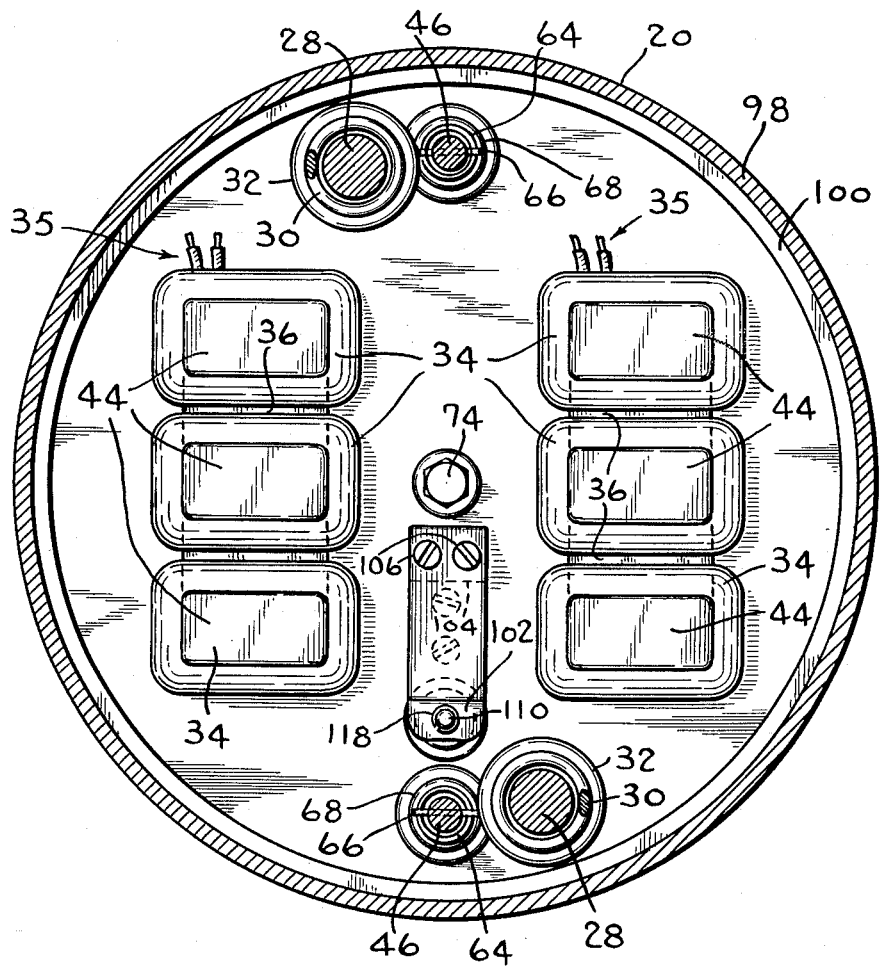
Fig. 4 is a view taken along line 4—4 of Fig. 1 showing the position of the electromagnets and the bimetallic element.
Figure 7:
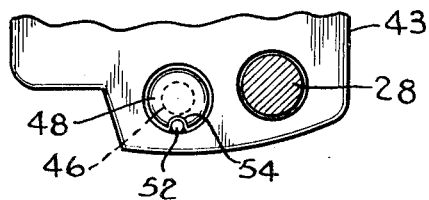
Fig. 7 is a fragmentary view taken along line 7—7 of Fig. 1 showing in detail the non-rotatable mounting of the release rods in the pressure plate.
Figure 8:
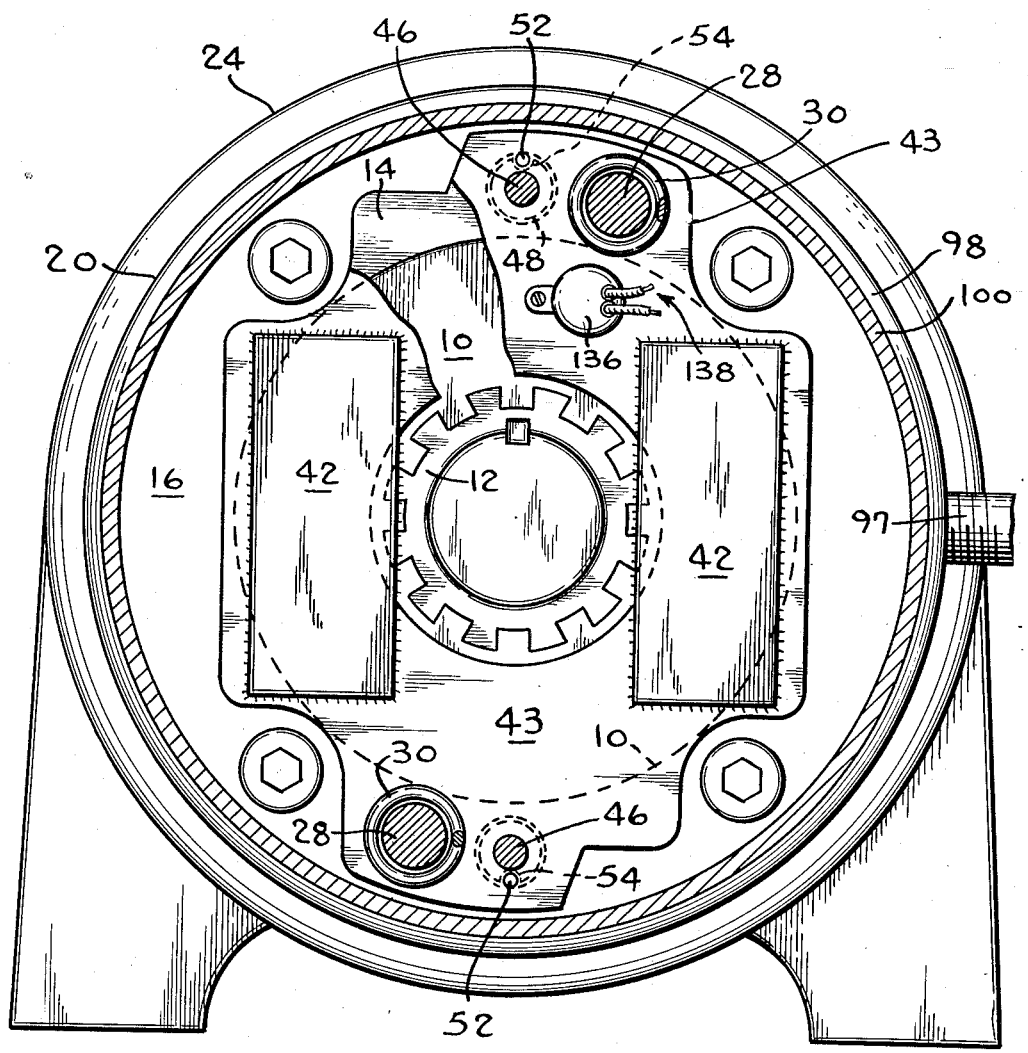
Fig. 8 is a view taken along line 8—8 of Fig. 1 showing the construction of the pressure plate.

The brake is manually released by mechanism which includes a pair of diametrically positioned release rods 46 extending between the pressure plate and the mounting plate. These rods have heads 48 which bear against shoulders 50 in the pressure plate. However, they have relative axial movement with respect to such plate and are restrained from rotation by pins 52 fixed to such plate and engaging slots 54 in such heads (Fig. 7). The outer ends of such rods have threaded portions 56 extending through holes in the mounting plate on which are threaded gear nuts 58. Ball type thrust bearings 60 are seated in counterbores 62 in the mounting plate to transmit thrust from the gear nuts to such plate. When the gear nuts are turned clockwise from the position shown in Fig. 3 the pressure plate will be drawn outwardly to render the springs ineffective and release the brake. When the gear nuts are turned counter-clockwise the rods will move axially inwardly letting the pressure plate set the brake. After this takes place such rods may still move axially inwardly to provide space between the heads and the shoulders. This provides an allowance for wear on the discs. It is desirable to maintain the bearings under thrust force and this is accomplished by coiled springs 64 reacting between pins 66 and felt wipers 68.

Figure 6:
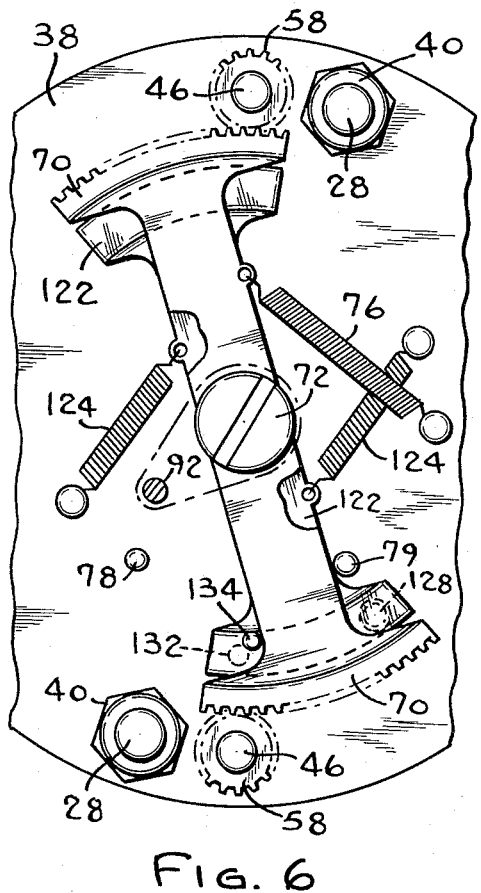
Fig. 6 is a view similar to Fig. 3 but showing the position of the parts after automatic heat release of the brake.
Figure 2:
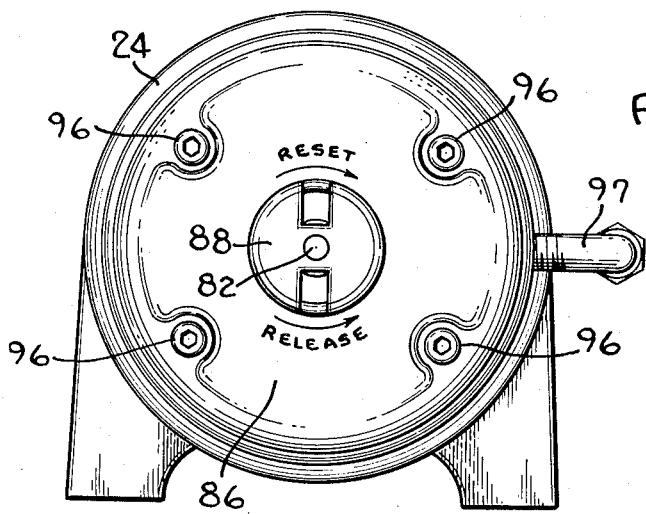
Fig. 2 is an end view of the brake showing the hand wheel for manually releasing the brake and for resetting the potential energy device.

One device for rotating the gear nuts in synchronism consists of a segmental drive gear 70 rotatably mounted on a pivot stud 72 secured by a press nut 74 to the mounting plate with its teeth engaged with each gear nut. When the segmental gear is rotated clockwise from the position shown in Figs. 5 and 6, the gear nuts will rotate counter-clockwise to set the brake. As the segmental gear is moved counter-clockwise the gear nuts will rotate clockwise to release the brake. There is enough force in springs 30 to provide sufficient friction between gear nuts 58 and rods 46 to hold the segmental gear in any position in which it is manually placed while still counteracting such springs. However, if the force in such springs is counteracted by the electromagnetic release, then such friction is greatly decreased and the segmental gear may be easily rotated to reset the rods in their inner position for free automatic operation of the brake. Such movement of the segmental gear is accomplished by a reset spring 76 which rotates the segmental gear clockwise until it is stopped by the automatic release mechanism hereinafter described.

The segmental gear is manually moved to brake release position (Fig. 5) by a reset arm 80 secured to a pin 82 rotatably and slidably mounted in a bearing 84 in a cover 86. A hand wheel 88 is secured to the outer end of the pin and a spring 90 acting between such wheel and cover normally keeps a projection 92 on the reset arm out of engagement with the segmental gear. However, when the hand wheel is pushed inwardly of the cover, such projection will move into the path of the segmental gear and counter-clockwise rotation of the hand wheel will be transmitted to the segmental gear to release the brake. This counter-clockwise rotation of the segmental gear is limited by stop pin 79 on the mounting plate.

The cover has an internal shoulder 94 which is drawn against the mounting plate by cap screws 96 to hold the cover to the housing. Overlapping snugly interfitted peripheral flanges 98, 100 on the housing and cover, respectively, make the casing sufficiently pressure tight to prevent escape of burning gases and still permits the cover to adjust to any changes made in the mounting plate as wear on the discs occurs. The cover is easily removed to expose all parts for adjustment and replacement. A coupling assembly 97 threaded into an opening in the housing provides a sealed conduit for bringing the various lead wires out from the interior of the housing to maintain this pressure tight construction.

The automatic heat release mechanism mentioned previously includes a bimetallic element 102 fastened to a bracket 104 by screws 106. The bracket is mounted on the inner face of mounting plate 38 with the bimetallic element spaced therefrom and positioned adjacent pressure plate 43 in an area where heat produced by the brake will be readily sensed by the element. An adjustable rod 108 with a base 110, a section 112 of reduced diameter threaded in the base, and a lock nut 114 threaded on such section extends between the bimetallic element and the mounting plate through felt wiper 115. The base of the rod is mounted in an opening 116 in the free end of the bimetallic element and secured therein by lock washer 118. The section of reduced diameter is slidably mounted in an opening 120 in the mounting plate for axial movement therein as the bimetallic element is deformed due to increased temperature.

A potential energy device for actuating the brake release mechanism includes a weighted driver 122 rotatably mounted at its center on pivot stud 72 with coil springs 124 biasing the driver in a counter-clockwise direction as viewed in the drawings. A lock mechanism in the driver spaced from the center includes a cavity 126 opening toward the mounting plate 38 in which is slidably fitted a lock pin 128 biased outwardly by a spring 130. When the driver is rotated against the tension of springs 124 to a position shown in Fig. 3 the lock pin will snap into a counterbore 132 in the mounting plate concentric with opening 120 to thereby lock the driver in a cocked position.

As the temperature of the bimetallic element increases, due, for example, to frequent setting of the brake, or a shorted coil, it will move rod 108 toward lock pin 128 and force it against the bias of spring 130. When a predetermined critical temperature, set with regards to the safety standards required for use in a specific hazardous location, is reached the rod will have moved a sufficient distance to force the lock pin out of counterbore 132. The driver member 122 will then rotate under the bias of springs 124 in a counter-clockwise direction and a projection 134 thereon will engage the segmental gear 70 causing it to rotate therewith to the position shown in Fig. 6 to release the brake and thus cease the heat caused by friction of the brake discs. Stop pin 79 on the mounting plate serves to limit the counter-clockwise rotation of the driver and segmental gear.

When properly adjusted to provide space between heads 48 and shoulders 50 for accommodating wear, springs 124, when the potential energy device is released, will contract losing some of their potential energy before the heads 48 make contact with the shoulders 50. However, such energy is transmitted to the weighted driver in the form of momentum which is then utilized with remaining potential energy in the springs to actuate the release mechanism. By reason of using a locked potential energy device, the bimetallic element for operating the lock may be sensitive to slight changes in temperature and the safety device accurate within close limits. The critical temperature can be varied by adjusting the length of rod 108, by using bimetallic elements of different properties, or by changing the relative position of the element with respect to the pressure plate.

To reset the potential energy device, hand wheel 88 is pushed inwardly of the cover moving projection 92 on reset arm 80 into the path of the segmental gear. Clockwise rotation thereof will be transmitted to driver 122 through the segmental gear and projection 134 until lock pin 128 snaps into counterbore 132. The brake is then set and the heat release mechanism and potential energy device are now restored to normal operating position.

In applications where the brake is used not only to stop the motor but also to hold a load, a thermostatic switch 136 of conventional design is mounted in a cavity 140 in pressure plate 43 and connected by conductors 138 between the motor and its source of electrical power. The switch is set to open before the thermostatically operated lock thus stopping the motor and de-energizing the electromagnetic coils to prevent further increase in temperature from too frequent cycling of the brake or shorted coils. However, the brake remains set by spring pressure to hold the load. If the switch fails to operate properly or if after it stops the motor the temperature continues to rise due to brake slippage under the load, the automatic release mechanism described above will function to release the brake and arrest any further temperature increase.

We claim:

1. In an automatic brake of the type biased to set and electromagnetically released, mechanism for releasing said brake, safety means to actuate said mechanism, and temperature responsive means operatively connected to said safety means and adapted to trigger said safety means when the brake becomes overheated.

2. A brake according to claim 1 in which said safety means includes potential energy means in the form of a spring biased weighted member having a stressed cocked position upon release from which said potential energy means actuates said mechanism.

3. A brake according to claim 2 in which there is a lock for holding said safety means with said potential energy means in cocked position, said lock being controlled by said temperature responsive means.

4. A brake according to claim 3 in which there is manual means to actuate said mechanism.

5. A brake according to claim 4 in which there is means operable between said mechanism and said safety means to cock said potential energy means by said manual means.

6. In an automatic brake, a brake housing, a brake mounted in said housing, a pressure plate movable in one direction to set said brake and in the opposite direction to release said brake, spring means to move said plate in the direction to set the brake, electromagnetic means to move said plate in said opposite direction to release said brake, mechanism operable to move said plate in said opposite direction to release said brake, safety means for automatically operating said mechanism, and temperature responsive means operatively connected to said safety means and adapted to trigger said safety means when the brake becomes overheated.

7. An automatic brake according to claim 6 in which said safety means includes potential energy means in the form of a spring biased weighted member having a stressed cocked position upon release from which said potential energy means actuates said mechanism, and in which there is a lock to hold said safety means with said potential energy means in cocked position, said lock being operated by said temperature responsive means.

8. An automatic brake according to claim 7 in which there is manual means to actuate said mechanism.

9. An automatic brake according to claim 8 in which said manual means is operable from outside the brake housing.

10. An automatic brake according to claim 8 in which there is means operable between said mechanism and said safety means to cock said potential energy means when said mechanism is actuated by said manual means.

11. An electric motor, a source of power for said motor, a brake housing secured to said motor, a brake in said housing connected with said motor, spring means to set said brake, electromagnetic means to release said brake when said electric motor is energized, potential energy means to release said brake, thermostatic means in said housing to release said potential energy means at a critical temperature, and a thermostatic switch in said housing connecting said motor and said electromagnetic means to said source of power, said thermostatic switch being set to open at a predetermined brake temperature lower than said critical temperature.

12. In an automatic brake of the type biased to set and electromagnetically released, mechanism for releasing said brake, safety means to actuate said mechanism, temperature responsive means operatively connected to said safety means and adapted to trigger said safety means when the brake becomes overheated, said safety means including a pivotally mounted weighted driver, and biasing means fastened to said driver to pivot it and cause it to actuate said mechanism when said safety means is triggered by said temperature responsive means.

References Cited in the file of this patent
UNITED STATES PATENTS

| | | |
|---|---|---|
| Re. 21,497 | Trombetta | June 25, 1940 |
| 2,152,489 | Lamb | Mar. 28, 1939 |
| 2,514,693 | Chapman | July 11, 1950 |
| 2,700,439 | Hodgson | Jan. 25, 1955 |
| 2,764,027 | Otto | Sept. 25, 1956 |
| 2,844,227 | Armstrong | July 22, 1958 |

FOREIGN PATENTS

| | | |
|---|---|---|
| 178,107 | Austria | Apr. 10, 1954 |
| 1,091,677 | France | Nov. 3, 1954 |